US012715137B2

(12) United States Patent
Gruenstein et al.

(10) Patent No.: US 12,715,137 B2
(45) Date of Patent: Aug. 25, 2026

(54) ROBOTIC SYSTEM

(71) Applicant: Tutor Intelligence, Inc., Cambridge, MA (US)

(72) Inventors: Joshua Aaron Gruenstein, Cambridge, MA (US); Alon Zechariah Kosowsky-Sachs, Cambridge, MA (US)

(73) Assignee: Tutor Intelligence, Inc., Cambridge, MA (US)

( * ) Notice: Subject to any disclaimer, the term of this patent is extended or adjusted under 35 U.S.C. 154(b) by 413 days.

(21) Appl. No.: 18/278,811

(22) PCT Filed: Mar. 2, 2022

(86) PCT No.: PCT/US2022/018567
§ 371 (c)(1),
(2) Date: Aug. 24, 2023

(87) PCT Pub. No.: WO2022/187395
PCT Pub. Date: Sep. 9, 2022

(65) Prior Publication Data

US 2024/0131712 A1 Apr. 25, 2024
US 2024/0227190 A9 Jul. 11, 2024

Related U.S. Application Data

(60) Provisional application No. 63/156,832, filed on Mar. 4, 2021.

(51) Int. Cl.
*B25J 9/16* (2006.01)

(52) U.S. Cl.
CPC ............ *B25J 9/1687* (2013.01); *B25J 9/163* (2013.01); *B25J 9/1697* (2013.01)

(58) Field of Classification Search
CPC ...... B25J 9/1687; B25J 9/1697; B25J 9/1664; B25J 9/1689; B25J 9/163;
(Continued)

(56) References Cited

U.S. PATENT DOCUMENTS 10,766,136 B1 * 9/2020 Porter .................... G06N 3/045
10,766,137 B1 * 9/2020 Porter ...................... B25J 9/163
(Continued)

FOREIGN PATENT DOCUMENTS

WO WO-2021021630 A1 2/2021

OTHER PUBLICATIONS

Sorokin et al., People helping robots helping people: Crowdsourcing for grasping novel objects, 2010, IEEE, p. 2117-2122 (Year: 2010).*

(Continued)

*Primary Examiner* — Mcdieunel Marc

(74) *Attorney, Agent, or Firm* — Morrison & Foerster LLP

(57) ABSTRACT

Systems and methods for a robotic platform comprising an on-demand intelligence component. An exemplary computer-enabled method for operating a robot comprises obtaining an instruction for the robot, wherein the instruction is associated, with a first user; identifying, based on the instruction, a task; transmitting the task to the robot; receiving, from the robot, a request associated with the task; determining whether the request can be solved by one or more trained machine-learning algorithms; if the request cannot be solved by the one or more trained machine-learning algorithms. transmitting a query to a second user's electronic device; receiving a response to the query from the second user; and causing the task to be performed by the robot based on the response.

17 Claims, 6 Drawing Sheets

(58) Field of Classification Search
CPC ........... G05B 2219/40391; G05B 2219/40153; G05B 2219/40116
See application file for complete search history.

(56) References Cited

U.S. PATENT DOCUMENTS

| | | | | |
|---|---|---|---|---|
| 10,792,810 | B1 * | 10/2020 | Beckman | B25J 9/163 |
| 10,800,040 | B1 * | 10/2020 | Beckman | B25J 9/1605 |
| 10,926,408 | B1 * | 2/2021 | Vogelsong | B25J 9/163 |
| 11,847,618 | B2 * | 12/2023 | Cupersmith | B25J 9/1676 |
| 2013/0343640 | A1 | 12/2013 | Buehler et al. | |
| 2017/0057081 | A1 * | 3/2017 | Krohne | B25J 11/0085 |
| 2018/0215039 | A1 | 8/2018 | Sinyavskiy et al. | |
| 2020/0061811 | A1 | 2/2020 | Iqbal et al. | |
| 2021/0023711 | A1 | 1/2021 | Lee et al. | |
| 2021/0031364 | A1 | 2/2021 | Groz | |
| 2022/0233119 | A1 * | 7/2022 | Shelton, IV | A61B 17/07207 |
| 2023/0098602 | A1 * | 3/2023 | Cella | B25J 9/1674 700/248 |
| 2023/0146947 | A1 * | 5/2023 | Shelton, IV | A61B 17/1285 606/144 |
| 2023/0222454 | A1 * | 7/2023 | Cella | G06Q 10/06315 705/28 |

OTHER PUBLICATIONS

Ma et al., Cloud-assisted humanoid robotics for affective interaction, 2016, IEEE, p. 1-5 (Year: 2016).*

Ganesan et al. A Survey on Chatbots Using Artificial Intelligence, 2020, IEEE, p. 1-5 (Year: 2020).*

Zhang et al., Research on Intelligent Chat Robot Based on Big Data Analysis, 2020, IEEE, p. 692-695 (Year: 2020).*

Extended European Search Report and Written Opinion received for European Patent Application No. 22764000.0 mailed on Mar. 27, 2025, 11 pages.

International Search Report and Written Opinion received for International Patent Application No. PCT/US2022/018567 mailed on Jul. 7, 2022, 16 pages.

* cited by examiner

ROBOTIC SYSTEM

CROSS-REFERENCE TO RELATED APPLICATION

This application is a national stage application under 35 U.S.C. § 371 of International Application No. PCT/US2022/018567, filed on Mar. 2, 2022, which claims the benefit of U.S. Provisional Application 63/156,832 filed on Mar. 4, 2021, the entire contents of which are incorporated herein by reference for all purposes.

FIELD OF INVENTION

The present disclosure relates generally to robotic systems, and more specifically to systems and methods for a robotic platform comprising an on-demand intelligence component.

BACKGROUND

Traditional automation systems may be programmed to work with a limited number of specific objects in a strictly structured environment. However, robots in production environments encounter a diverse range of objects, environments, and tasks, making solutions built on classical computer vision or supervised machine-learning techniques brittle and limited in scope. For example, they are unsuited to manipulate (e.g., pick, place) arbitrary objects in unstructured environments. Further, traditional automation systems can be costly to develop and integrate, and are brittle against changes in the workflow. As a result, less than 0.5% of warehouses use advanced automation to manipulate objects.

Thus, companies still resort to human workers to pick and pack products. Human pickers are hard to train and hire, and they are often overworked, expensive, and unpredictable. Thus, warehouses and logistics networks are bottlenecked by the suboptimal performance of human workers.

BRIEF SUMMARY

The present disclosure includes a robotic platform comprising an on-demand intelligence component. The intelligence component can comprise a pool of remote human workers to execute unsolved components of robotic pipelines, allowing robots to, for example, handle arbitrary objects in unstructured environments. Rather than having human workers manually operate robots, the human workers provide answers to well-structured queries corresponding to sub-components of robotics pipelines. The intelligence component provides an immediate solution for unstructured tasks such as pick and place at a fraction of the cost (e.g., comparing to hiring human workers or developing customized automation solutions). Further, it provides speed, versatility, flexibility, and cheap integration. The robotic platform can be used to automate any task, such as tasks in warehouse management, manufacturing, delivery, inspection, logistics, etc.

Further, the data produced by the intelligence component can be in turn used to train supervised machine-learning models to gradually phase human workers out of the loop. For example, the system can aggregate datasets of human decisions, converting intractable robotics problems into solvable supervised learning problems.

An exemplary computer-enabled method for operating a robot comprises: receiving a natural-language instruction tier the robot, wherein the natural-language instruction is associated with a first user; identifying, based on the natural-language instruction, a task including a plurality of sub-tasks; determining whether each of the plurality of sub-tasks requires input by a second user; in accordance with a determination that a particular sub-task requires input by the second user, generating a query of a predefined format; transmitting the query to the second user's electronic device; receiving a response to the query from the second user; and causing the given task to be performed by the robot based on the response.

In some embodiments, the natural-language instruction directs the robot to pick and place one or more objects.

In some embodiments, the plurality of sub-tasks comprises a pick sub-task and a drop sub-task. The sub-tasks may also include scanning (either of the environment or of pre-specified home positions), pushing, barcode reading, or the execution of arbitrary trajectories in Cartesian or joint space.

In some embodiments, the query comprises an image and a query for one or more pick parameters.

In some embodiments, the pick parameters comprise a pick point, a grasp angle, a grasp depth, or any combination thereof.

In some embodiments, the query comprises an image and a query for one or more drop parameters.

In some embodiments, the drop parameters comprise a drop point, a rotation angle, a height for dropping, or any combination thereof.

In some embodiments, determining whether each of the plurality of sub-tasks requires input by a second user comprises: inputting data captured by the robot to a machine-learning model to obtain a solution and a confidence score associated with the parameter; in accordance with a determination that the confidence score exceeds a predefined threshold, causing the robot to perform the particular sub-task based on the solution; and in accordance with a determination that the confidence score does not exceed the predefined threshold, generating the query.

In some embodiments, the data captured by the robot comprises an image.

In some embodiments, the method further comprises training the machine-learning model based on the response from the second user.

An exemplary electronic device comprises: one or more processors; a memory; and one or more programs, wherein the one or more programs are stored in the memory and configured to be executed by the one or more processors, the one or more programs including instructions for: receiving a natural-language instruction for the robot, wherein the natural-language instruction is associated with a first user; identifying, based on the natural-language instruction, a task including a plurality of sub-tasks; determining whether each of the plurality of sub-tasks requires input by a second user; in accordance with a determination that a particular sub-task requires input by the second user, generating a query of a predefined format; transmitting the query to the second user's electronic device; receiving a response to the query from the second user; and causing the given task to be performed by the robot based on the response.

An exemplary non-transitory computer-readable storage medium stores one or more programs, the one or more programs comprising instructions, which when executed by one or more processors of an electronic device, cause the electronic device to: receive a natural-language instruction for the robot, wherein the natural-language instruction is associated with a first user; identify, based on the natural-language instruction, a task including a plurality of sub-tasks; determine whether each of the plurality of sub-tasks requires input by a second user; in accordance with a determination that a particular sub-task requires input by the second user, generate a query of a predefined format; transmit the query to the second user's electronic device; receive a response to the query from the second user; and cause the given task to be performed by the robot based on the response.

DETAILED DESCRIPTION

Figure 1A:
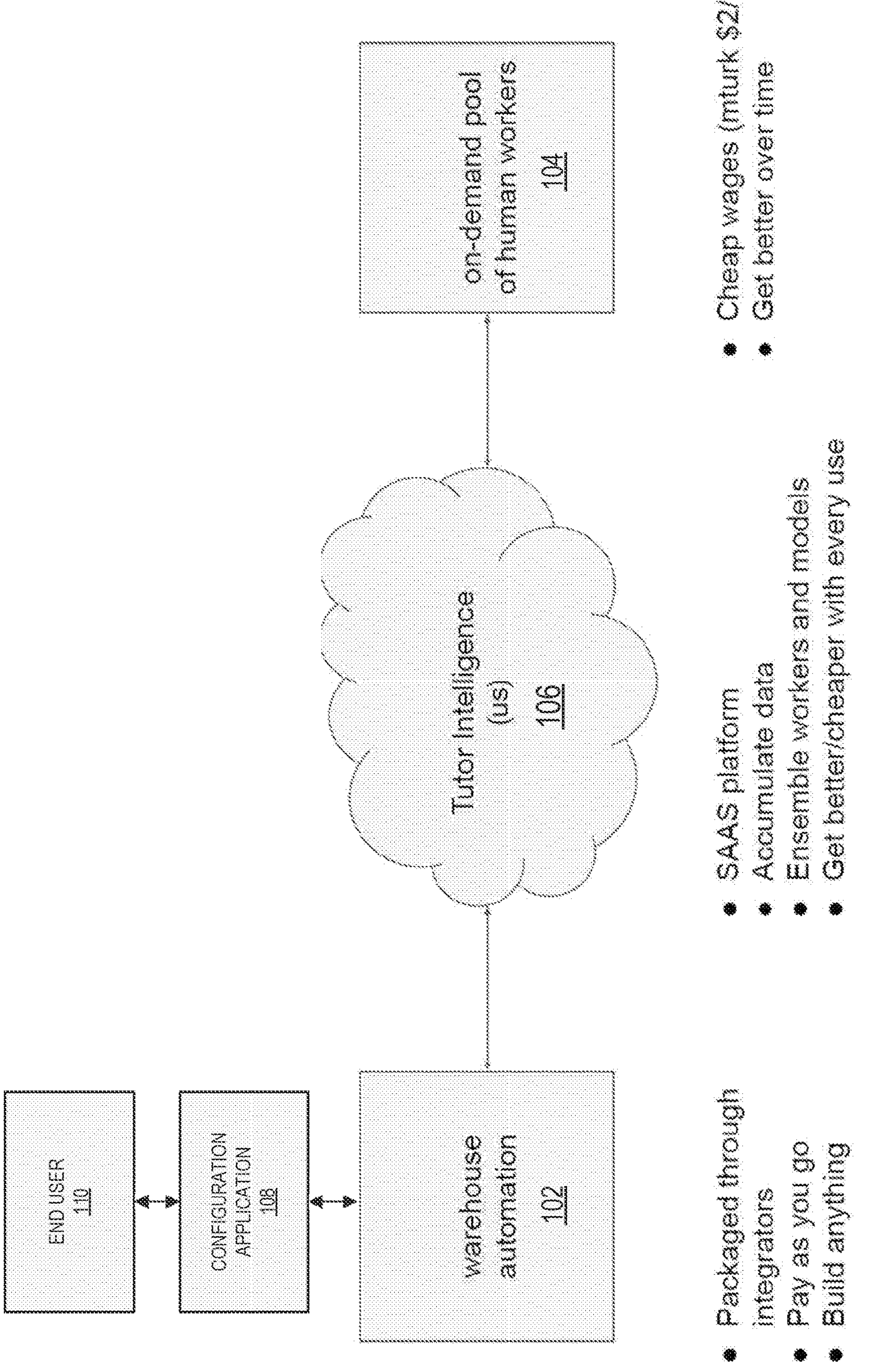
FIG. 1A illustrates an exemplary robotic platform, in accordance with some embodiments.

The present disclosure includes a robotic platform comprising an on-demand intelligence component. The intelligence component can comprise a pool of remote human workers to execute unsolved components of robotic pipelines, allowing robots to handle arbitrary objects in unstructured environments. The intelligence component provides an immediate solution for unstructured tasks like pick and place at a fraction of the cost (e.g., comparing to hiring human workers or developing customized automation solutions). Further, it provides speed, versatility, flexibility and cheap integration. The robotic platform can be used to automate any task, such as tasks in warehouse management, manufacturing, delivery, inspection, logistics, etc.

Further, the data produced by the intelligence component can be in turn used to train supervised machine-learning models to gradually phase human workers out of the loop. For example, the system can aggregate datasets of human decisions, converting intractable robotics problems into solvable supervised learning problems.

The following description is presented to enable a person of ordinary skill in the art to make and use the various embodiments, Descriptions of specific devices, techniques, and applications are provided only as examples, Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and; or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1A illustrates an exemplary system, in accordance with some embodiments. The system comprise one or more robots 102, one or more human workers 104 responding to queries, and a cloud platform 106 communicatively coupled with the robots and the human workers. Optionally, the system further comprises a configurations application 108 and one or more end users 110.

The robots 102 comprise sensing modules (e.g., camera, LiDAR sensor) and actuation modules (e.g., robotic arm). In some embodiments, the robotic arm comprises a camera at the end effector. In some embodiments, one or more components of the robots (e.g., camera) are connected to the Internet.

In some embodiments, the robots 102 are pick-and-place robots. Each robot can comprise one or more vacuum grippers with suction cups that grasp objects from a surface normal (e.g., Robotiq AirPick), parallel jaw grippers with two fingers that grasp from the side (e.g., Robotiq 2f-85), or any combination thereof. Different types of pick-point specifications are required for the two modes of grippers, and objects are often better suited for one type of gripper than another. In some embodiments, the robot may query the cloud platform 106 for which gripper to use (posed as a request form described below), and can switch grippers accordingly. It should be appreciated that any of robots 102 can be any type of robots that can be used to perform one or more tasks, such as pick-and-place robots having any type of gripping mechanisms.

In some embodiments, the robots 102 can be configured using configuration information before executing a task. As shown in FIG. 1A, the configuration information may be specified by the end user 110 (e.g., via a configuration application 108). Additionally or alternatively, the configuration information may also be specified by another user (e.g., human worker 104) or automatically by a different computer system (e.g., via an API).

The configuration information provides enough information during configuration such that the robot can operate independently. For example, the end user can specify broad directives/commands for the robot, such as a high level task in natural language, a home position from which the workspace is visible, and additional high level task settings (e.g., whether the robot needs to be able to rotate objects). For example, a broad directive may be "sort the apples into the left bin and the bananas into the right bin" or "sort UPS packages into the left bin and Fedex packages into the right bin."

In some embodiments, the robots 102 are registered and visible to the end user 110 through the configuration application 108. The configuration application 108 can be accessed using a user device (e.g., mobile device, desktop computer). The end user can view the status of all of their robots (e.g., running, stopped, offline, or emergency-stopped). In some embodiments, the end user 110 provides instructions (e.g., natural language instructions) via a user interface of the configuration application 108. For example, the user can provide the instruction via a textual input by typing a natural language text string into a user interface of the configuration application 108. As another example, the user can provide the instruction via speech input. As another example, the user can provide the instruction by selecting from preset options. It should be appreciated that any type of user interface may be provided by the configuration application 108 to allow input of configuration information such as natural-language instructions, for example, graphical user interfaces (e.g., of a web application) or programming interfaces.

In some embodiments, the configuration process comprises two steps. In a first step, a robot is positioned to an initial position (or home position). For example, the robot can be configured to point at its workspace (e.g., table with bins on it, a conveyer belt) such that all items to be manipulated are visible to the sensing modules. In the second step, instructions (e.g., natural language instructions) can be provided to the robot for what the robot should do (e.g., "sort the apples into the left bin and the bananas into the right bin," "sort UPS packages into the left bin and Fedex packages into the right bin"). In some embodiments, the configuration can be done only while the robot is stopped.

In some embodiments, the configuration process is tailored based on a target application of the robots (e.g., assembly, packaging, bin picking, inspection) and thus the configuration application 108 may provide different user interfaces depending on the target application of the robots to facilitate input of the configuration information for the robots. For example, if the target application of the robots is to make kits of parts, the configuration application can provide a user interface allowing the user to select bins of parts and how many of each part should be picked to form a kit. This configuration would inform the high level robot procedure, and the order and parametrization of high level operations such as picking, placing, and pushing. As another example, if the target application of the robots is to make kits of parts, the configuration application can be configured to receive and analyze a natural-language input to identify bins of parts and how many of each part should be picked to form a kit. In some embodiments, to determine the target application of the robots, the configuration application can receive an input indicating the target application of the robots to be configured and provide the corresponding user interface based on the target application. In some embodiments, to determine the target application of the robots, the configuration application can automatically analyze the robots to be configured, identify a target application of the robots, and provide the corresponding user interface to configure the robots accordingly.

Once the robot is configured, it can be started and begin to execute its main loop. At any time, the robot can be stopped from within the configuration application. For example, the end user can manually start and stop a robot via the configuration app. In some embodiments, the robot constantly queries the cloud platform 106 to determine its state (e.g., started or stopped), and behaves accordingly. In some embodiments, the robot receives command instructions and status updates from the cloud platform, rather than querying the configuration application for information and instructions. If the robot state changes from stopped to running, it queries the cloud service to find (or is automatically sent) its configuration data (e.g., the workspace pose and natural language instructions). If the robot stops unexpectedly (e.g. due to a safety issue, or the environment becoming misconfigured), the end user is notified through the app.

In some embodiments, the configuration process includes additional configuration steps performed by human workers 104, either to modify the end-user 110's configuration or to perform additional configuration steps. Combined, the configuration steps performed by the end user 110 and the human workers 104 can replace or augment traditionally highly-skilled programmatic systems integration work using lower-skill, on-demand labor.

The robots 102 can run software programs to execute the tasks to fulfill a command (e.g., specified by the configuration information provided by the end user). In some embodiments, the robots 102 comprises an embedded platform that runs the software programs. The programs can be structured as a loop to repeatedly execute a task. Exemplary tasks include picking and placing objects, verifying an image matches a set of defined conditions (e.g., that an e-commerce package contains all requisite items), etc. Each task can comprise multiple sub-tasks performed in a loop. Some sub-tasks of this loop may be locally executed (i.e., using parameters inferred by the robot), while other sub-tasks are outsourced to the cloud software by calling a proprietary API linked to the robot software. In some embodiments, rather than the robot running an independent loop and outsourcing sub-tasks for cloud execution, the primary activity loop is run on the cloud, and sub-tasks are outsourced to the robot for local execution.

The cloud platform 106 can receive a request from the robots 102, Additionally or alternatively, the cloud platform is configured to automatically provide information to the robot based on the status of the activity loop (e.g., outsourcing sub-tasks). Exemplary requests or information can include selecting where to pick an item and where to place an item in an image according to instructions, determining the fragility of an item in an image, etc.

In some embodiments, the request is in a predefined form. For example, the request provided by the robot includes: an image of the workspace, one or more natural task language instructions (received from the end-user through configuration), and queries for pick parameters and drop parameters. More complex request forms may include additional data from the robot (such as reachable poses, candidate picks, more end-user configuration settings) and query for more information from the service/human workers (which gripper to pick with, an angle to grip at, an angle to drop at, a height to drop from, etc.).

In some embodiments, each request form has an associated dataset of all requests made of that form and their responses by the human workers, and associated machine learning models supervised from that data, sometimes categorized by task or application. As an example, a request form can be for identifying a pick point in an image, and it can be associated with a dataset comprising all requests made (including the images) and all responses (including the points identified in those images). A machine-learning model can be trained using the dataset to receive an input image and identify a pick point in the input image.

After receiving a request, the cloud platform can query the corresponding machine-learning models to decide whether the models can produce a high quality result, or if one or more human workers need to be queried. For example, an image is provided to the model and the model can output a predicted fragility of the item and output a confidence score. If the form model has high certainty or confidence for the request (e.g., above a predefined threshold), the cloud services uses the models to generate a response and returns it to the users. If the model is uncertain, the request can be added to a queue to be answered by remote human workers, and upon completion return it to the robot (and add the request to the associated dataset, which is then used to train models).

In some embodiments, additional algorithms can be used to double-check the results produced by either humans or models, e.g., by querying additional humans for consensus. Algorithms can also be used to provide higher compensation to workers who provide higher quality results.

In some embodiments, if more than one human workers are available to handle a request from the request queue, additional algorithms can be used to optimally match human workers and robot requests.

Figure 1B:
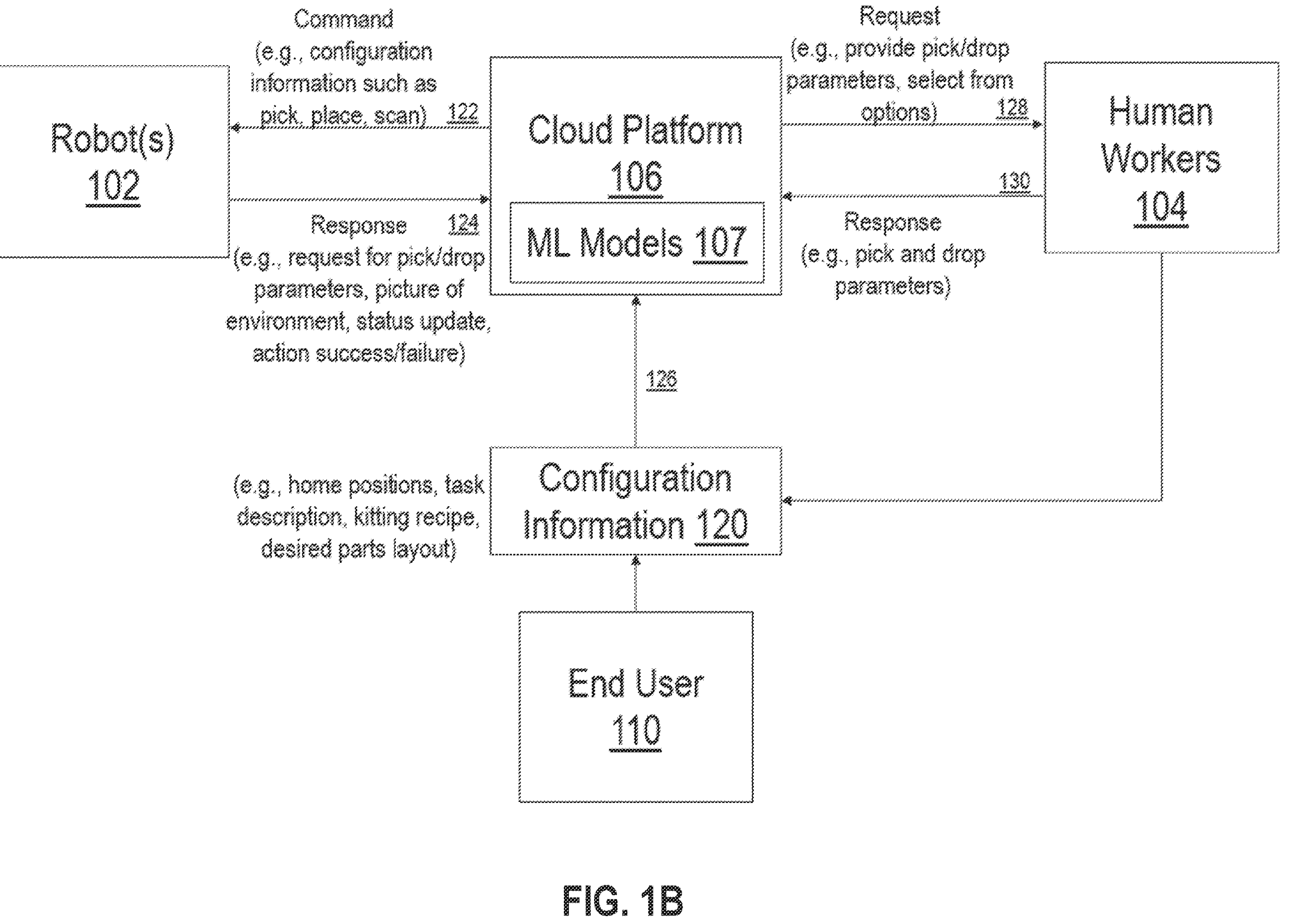
FIG. 1B illustrates an exemplary workflow, in accordance with some embodiments.

FIG. 1B illustrates an exemplary process for pick-and-place operations, in accordance with some embodiments. As shown, the end user 110 can provide configuration information 120 (e.g., a natural language instruction, settings) for the robot via a configuration application. In some embodiments, the configuration information 120 may be additionally or alternatively provided by the human worker 104. In some embodiments, the configuration information 120 may be additionally or alternatively provided automatically by another computer system or software program (e.g., via an API). In some embodiments, the configuration data is entered by the end user, a human worker, and/or by an API, and transmitted to the cloud platform for storage and future access.

With reference to FIG. 1B, the configuration information 120 may be provided to the cloud platform 106, as shown by arrow 126. The configuration information may then be transmitted by the cloud platform 106 to the robot 102 such that the robot 102 can execute task(s) based on the configuration information, as shown by arrow 122. A robot may generate a response and transmits the response to the cloud platform 106, as shown by arrow 124. For example, the response can include a request for information that the robot needs to execute a task successfully. Exemplary requests or information can include selecting where to pick an item and where to place an item in an image according to instructions, determining the fragility of an item in an image, etc.

Upon receiving the request from the robot 102, the cloud platform 106 can process the request and obtain the information requested. In some embodiments, the cloud platform 106 processes the request using one or more machine-learning models 107. For example, the request from the robots 102 can include an image of an item and the request is to determine where to pick the item, and the cloud platform 106 can input the image and/or information about the item into a machine-learning model. The machine-learning model can output a point representing the original point and the second point of a pick arrow. The machine-learning model may also output a confidence score indicative of how confident the model is of the pick arrow. Based on the outputs of the machine-learning model (e.g., the pick arrow), the cloud platform can parametrize an action (e.g., pick parameters) to transmit to the robot 102.

As another example, the request from the robots 102 can include an image of a scene and the request is to determine where to place an item in the scene, and the cloud platform 106 can input the image and/or information about the item into a machine-learning model. The machine-learning model can output a point representing the original point and the second point of a place arrow. The machine-learning model may also output a confidence score indicative of how confident the model is of the place arrow. Based on the outputs of the machine-learning model (e.g., the place arrow), the cloud platform can parametrize an action e.g., place parameters) to transmit to the robot 102.

The inputs of the machine-learning models are not limited to images of scenes and information about items. The inputs may be points, numeric/categorical data (e.g., options like pick depth, approach angle), or some other form of input. The outputs of the machine-learning models are not limited to pick/place arrows and associated confidence scores. The outputs may be numeric/categorical predictions, or some other form of output.

In some examples, each of the original point and the second point can be in the form of a probabilistic distribution. The confidence score can be calculated based on the probabilistic distributions corresponding to the original point and the second point.

If the cloud platform cannot parametrize an action based on its learned models (e.g., if the confidence score is lower than a predefined threshold), the cloud platform may forward a request or query a human worker, as shown by arrow 128. Exemplary user interfaces shown to the human worker are provided in FIGS. 3 and 4. A solution to the request (e.g., pick and drop parameters) can be provided to the cloud platform by the human worker, as shown by arrow 130, and the cloud platform relays the solution to the robot to complete the task.

For example, the pick-and-place robot can perform the following steps in its running state, driven either by the robot itself or a cloud platform. In the process below, some steps are, optionally, combined, the order of some steps is, optionally, changed, and some steps are, optionally, omitted. For example, optimizations such as caching can allow some of these steps to be skipped in some cases (e.g. imaging). In some examples, additional steps may be performed in combination with the process. Accordingly, the operations as illustrated (and described in greater detail below) are exemplary by nature and, as such, should not be viewed as limiting.

1. Move to the initial position (i.e., home position) such that the workspace is visible. In some embodiments, this can be done using robot planning algorithms (e.g., IK or RRT).
2. Image the workspace with the camera mounted to the robot end effector.
3. Query the ML models in cloud platform 106 for a pick-point and a drop-point, given the natural language instructions from the configuration and the workspace image. If the ML model fails to produce a high confidence result, either the robot or the cloud platform can query a human worker for the pick-point and drop-point instead.
4. Navigate to the pick-point, pick the object, then navigate to the drop-point, and drop the object.
5. Goto step 1.

As shown above, some steps of this loop may be locally executed (e.g., steps 1 and 2) by the robot, while other steps (e.g., step 3) are performed by cloud software. This can be achieved either by the robot running the loop and querying the cloud model for pick/drop parameters, or the cloud model running the loop and querying the robot to perform actions.

Regarding step 3, picking and dropping are two different sub-tasks with different parameters. For dropping, a number of drop parameters may be queried. A human worker may be presented an image and asked to specify a point on the image for the object to be dropped. If the robot also needs to be able to rotate objects, the human worker may also be asked to specify an angle, likely inputted as an arrow dragged from the specified drop point. If objects are fragile, the robot may also need to know the height from which to drop an object, or the angle of approach.

For picking, different pick parameters may be queried for different types of grippers. For vacuum grippers, the robot needs a single point on an object to parametrize a pick. In the user interface for remote human workers, they may be presented with an image of what the robot sees, and would click on a point on an object. For parallel jaw grippers, the robot may need a point for the center of the grasp, the angle of the grasp, and the grasp depth (e.g., for a cube, should the grasp near the top or near the bottom).

In some embodiments, if step 4 cannot be successfully performed, the process returns to step 3 in order to implement a successful pick. For example, the robot may find the returned pick-point outside the reach of the robot and thus kinematically invalid, and it would repeat step 3 for an alternative solution.

Regarding step 4, once a pick and place have been parametrized, the robot can navigate to the pick-point, pick the object according to the pick parameters, and then navigate to the drop point. The navigation step here can be solved in multiple ways.

In some embodiments, the method is based on a planning-based approach as follows:

1. The robot takes a depth image of the workspace (in the home position) using a depth camera mounted to the end-effector.
2. The robot builds a point-cloud out of the depth image of the workspace.
3. The robot queries the cloud platform 106 for pick and drop parameters, or is instructed by the cloud platform to perform a pick and drop with given parameters. The parameters, as discussed above, may be obtained by the cloud platform using machine-learning models or human workers.
4. The robot uses the point-cloud to project the returned pick-point into a real point in 3D space. It then computes the surface normal of this point.
5. The robot then queries an Inverse Kinematics (I.K.) softer (subject to constraints) to identify the robot joints angles that would place the end effector at the pick-point, facing the surface normal, or at some other angle specified by the cloud platform.
6. The robot then queries a motion planning algorithm (e.g. RRT, interpoiated IK, or joint-space interpolation) to compute a trajectory of robot joint angles over time that would (physically plausibly) allow the robot to get from where it is to the pick point.
7. As soon as the robot gets a drop-point, it projects the point into a 3D point and surface normal, shifted upwards by the drop height. It then runs IK and motion planning to compute a path to the drop point from the pick-point (this is similar to the above three steps), and from the drop point to the home position.
8. The robot then executes the precomputed plan to the pick-point, and executes the pick according to the pick parameters.
9. The robot then executes the precomputed plan to the drop-point, and drops the item.
10. The robot then executes the precomputed plan to the home position.
11. Goto step 1.

The above approach may rely on high quality depth sensing to compute 3D points and surface normals. In real-world settings, depth cameras often have suboptimal performance, which could impact the performance using the above pipeline. An alternative approach to 3D point projection using depth cameras is "visual servoing" as follows:

1. The robot takes an image of the workspace (in the home position) using a camera mounted to the end-effector.
2. The robot then uses a controller to move the robot in such a way that the specified pick-point remains centered in the camera, and that the robot gets closer to the pick-point (visual servoing).
3. Once the robot collides with the object (or uses a sensor to pre-empt collision), it executes the pick according to the specified parameters. The parameters, as discussed above, may be obtained by the cloud platform using machine-learning models or human workers.
4. The robot either (a) executes a plan to the drop-point using the pipeline above (error in a drop point is much less problematic than error in a pick point), or (b) executes a plan back to the home position and visual servos to the drop position.
5. The robot executes the drop, and navigates back to the home position using planning-based approach.
6. Goto step 1.

In some embodiments, during the above process, if the robot/cloud service discovers an irrecoverable or safety error (e.g., the robot is stuck, the bins to be sorted are missing), the robot can set its state to stopped (or e-stopped in the case of a safety error) and alert the end-user appropriately through the configuration app 108. Further, in any step of the process, if the robot needs information to execute any sub-task, it may query the cloud platform, and the cloud platform may respond to the request using one or more machine-learning models and human workers.

In some embodiments, the robot has access to a first set of one or more machine-learning models (e.g., locally stored models) and uses the first set of one or more machine-learning models to determine parameters. For example, the robot may input one or more images into the first set of models to determine the pick parameter(s) and a first confidence score associated with the output. If the first confidence score does not exceed a first threshold, the robot then generates the request, which may include the same images, to be sent to the central platform. At the central platform, a second set of machine-learning models can be used to determine the pick parameter(s) and a second confidence score associated with the output. If the second confidence score does not exceed a second threshold, human workers may be queried as described herein.

Over time, this process generates a labeled dataset. For example, the dataset can include a plurality of images, each including a labelled pick point (e.g., labelled by human workers). The dataset can be used to train a machine-learning model (e.g., one of the form models used by the cloud platform 106 described above) configured to identify a pick point when given an input image. Accordingly, the system can phase humans out of the loop over time.

The cloud platform can be integrated with different types of robotic systems, including pre-existing pick-and-place systems. In some embodiments, a hardware component can be plugged into a third-party robot to allow the robot to operate as described herein. In some embodiments, a custom package including a custom robotic arm, a camera, and software capabilities to communicate with the cloud platform can be provided.

Figure 3:
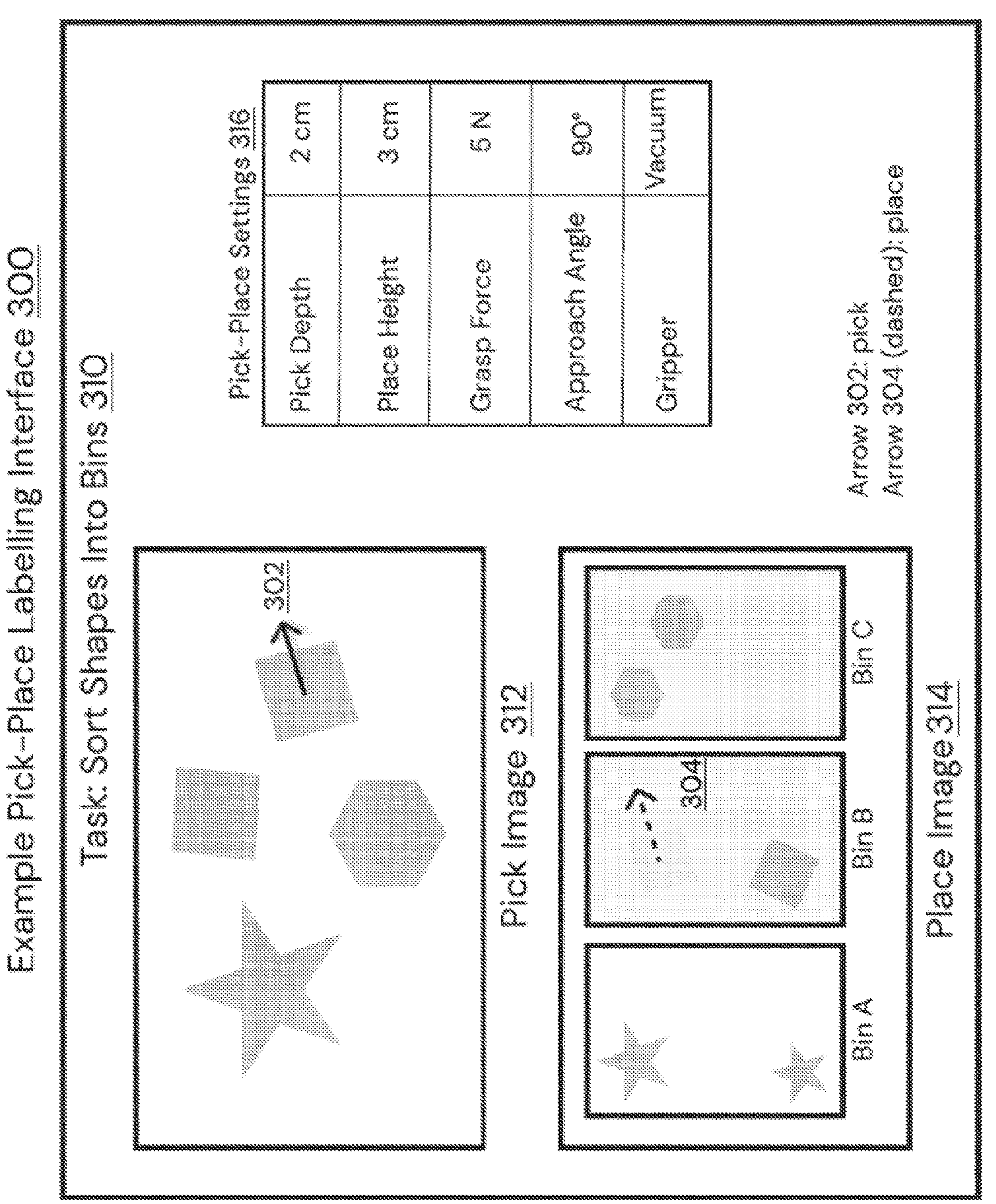
FIG. 3 illustrates an exemplary user interface, in accordance with some embodiments.

FIG. 3 illustrates an exemplary user interface 300 provided to a human worker, in accordance with some embodiments. The user interface 300 prompts the human worker to solve a task 310 ("Son Shapes Into Bins"). The user interface can include one or more images of a workspace. In the depicted example, the user interface 300 includes an image 312 depicting the objects to be sorted, and an image 314 depicting the bins that the objects need to be sorted into. Both images 312 and 314 may be captured by the robot that has been tasked with sorting the physical objects represented in the image 312 into physical bins represented in the image 314, as discussed above. In some embodiments, the images are pre-processed to eliminate sensitive information.

In some embodiments, components of pick and drop parameters may be represented as graphical annotations on an image (or other graphical representation) of the workspace. For example, a pick may be represented as an arrow, where the first point selected is the center-point of the gripper, and the second point represents the rotation of the gripper, and the extension in the case of a two fingered gripper with variable width. As shown in FIG. 3, the human worker can add an arrow 302 onto the image 312 to indicate the pick parameters for an object. The human worker can add an arrow 304 onto the image 314 to indicate where the object is to be dropped. The human worker's solutions (i.e., the pick and drop parameters) can be transmitted to the cloud platform and then to the robot such that the robot can physically execute the pick-and-sort task. Additional settings 316 can be provided to the human worker, and they can be modified.

It should be appreciated that robotic tasks can be parametrized in any suitable manner. For example, an additional point can be used to determine the starting point before an approach towards a pick or drop location, enabling the human worker to control angle of the approach and path way points.

As shown in FIG. 3, the labeling interface for selecting picks and places may involve a snapshot of the picked item generated during the pick annotation, either as a crop or a different form of segmentation. This snapshot may be used during drop selection as a preview of the item in the new location, translating with different place point selection and rotating with different place arrow selection.

Figure 4:
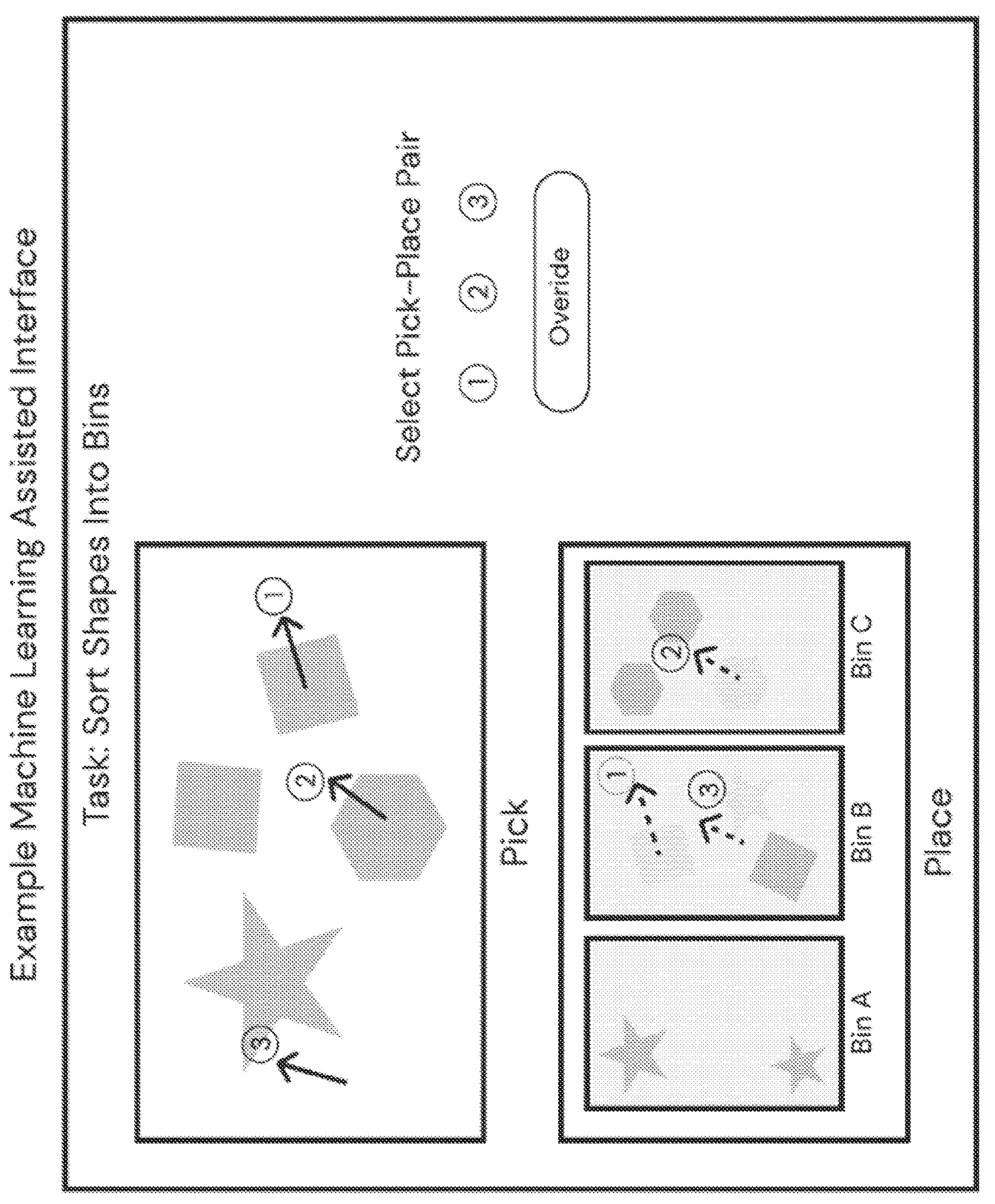
FIG. 4 illustrates an exemplary user interface, in accordance with some embodiments.

In some embodiments, queries sent to human workers include inferences generated by machine-learning models (e.g., machine-learning models 107 in FIG. 1B). The ask for the human worker may be to select from a set of inferences, correct the inferences, or reject them. FIG. 4 illustrates an exemplary user interface provided to a human worker, in accordance with some embodiments. The user interface 400 provides tentative solutions generated by machine-learning model(s): Solutions 1, 2, 3 for picking/placing three objects, respectively. In some embodiments, these solutions are associated with low confidence scores by the machine-learning model(s) and are thus presented to the human worker for further confirmation.

For each solution, the human worker may accept, reject, or modify it. For example, a human worker can determine that Solutions 1 and 2 provide correct solutions and accept them. On the other hand, Solution 3 provides incorrect pick parameters for properly picking the star-shaped object and an incorrect drop location for the star-shaped object. Thus, the human worker can reject and override them (e.g., by drawing new arrows on the images).

In some embodiments, the execution of instructions by the robot is automatically parallelized and pipelined, such that multiple instructions may run simultaneously, and instructions may consist of many sub-instructions which may run simultaneously or synchronously.

Figure 5:
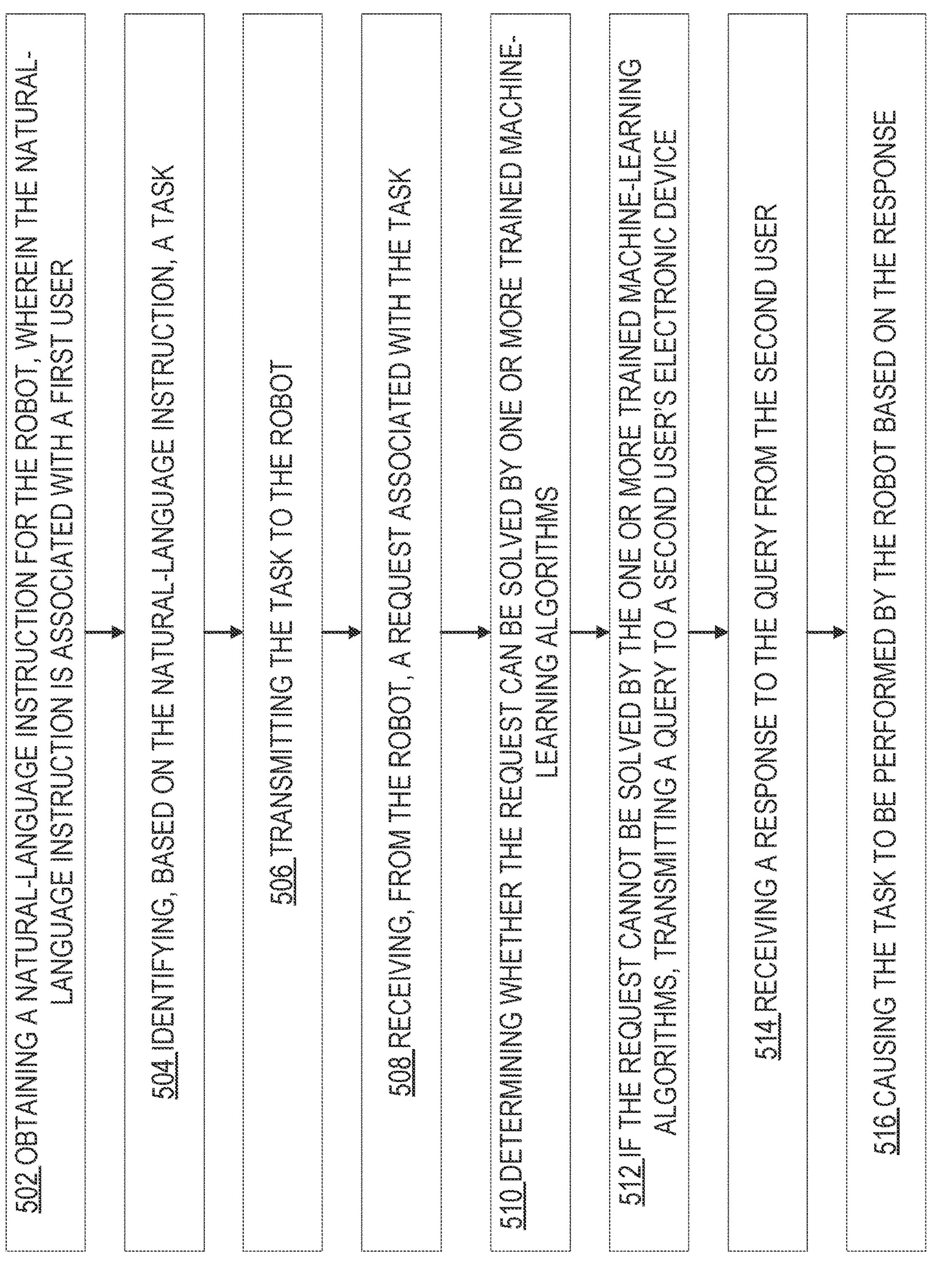
FIG. 5 illustrates process for operating a robot, according to various examples.

FIG. 5 illustrates process 500 for operating a robot, according to various examples. Process 500 is performed, for example, using one or more electronic devices implementing a software platform. In some examples, process 500 is performed using a client-server system, and the blocks of process 500 are divided up in any manner between the server and a client device. In other examples, the blocks of process 500 are divided up between the server and multiple client devices. Thus, while portions of process 500 are described herein as being performed by particular devices of a client-server system, it will be appreciated that process 500 is not so limited. In other examples, process 500 is performed using only a client device (e.g., user device 100) or only multiple client devices. In process 500, some blocks are, optionally, combined, the order of some blocks is, optionally, changed, and some blocks are, optionally, omitted. In some examples, additional steps may be performed in combination with the process 500. Accordingly, the operations as illustrated (and described in greater detail below) are exemplary by nature and, as such, should not be viewed as limiting.

At block 502, an exemplary system (e.g., one or more electronic devices) obtains a natural-language instruction for the robot, wherein the natural-language instruction is associated with a first user. At block 504, the system identifies, based on the natural-language instruction, a task. At block 506, the system transmits the task to the robot. At block 508, the system receives, from the robot, a request associated with the task. At block 510, the system determines whether the request can be solved by one or more trained machine-learning algorithms. At block 512, if the request cannot be solved by the one or more trained machine-learning algorithms, the system transmits a query to a second user's electronic device. At block 514, the system receives a response to the query from the second user. At block 516, the system causes the task to be performed by the robot based on the response.

Figure 2:
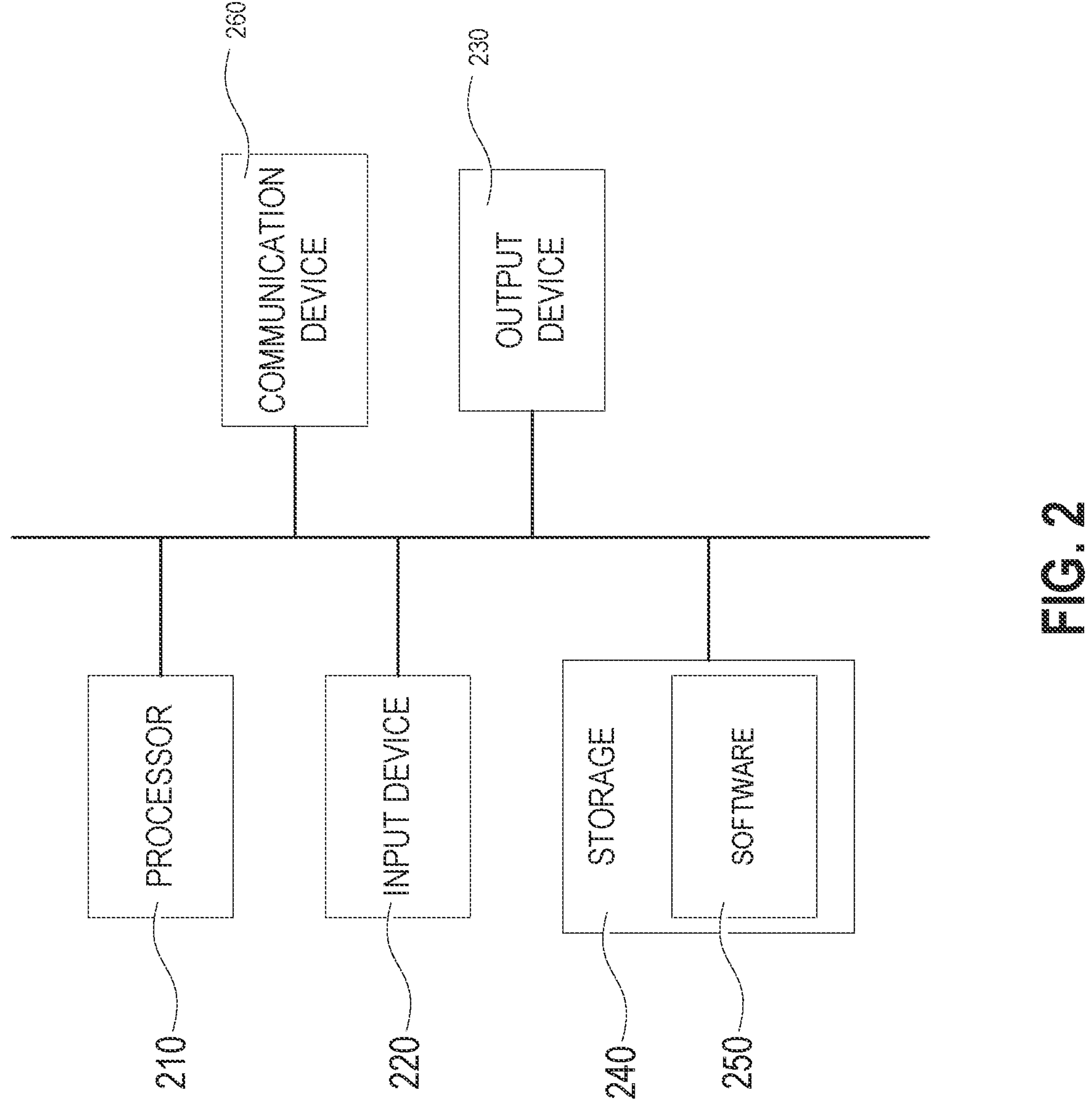
FIG. 2 illustrates an exemplary electronic device in accordance with some embodiments.

The operations described above are optionally implemented by components depicted in FIG. 2. FIG. 2 illustrates an example of a computing device in accordance with one embodiment. Device 200 can be a host computer connected to a network. Device 200 can be a client computer or a server. As shown in FIG. 2, device 200 can be any suitable type of microprocessor-based device, such as a personal computer, workstation, server or handheld computing device (portable electronic device) such as a phone or tablet. The device can include, for example, one or more of processor 210, input device 220, output device 230, storage 240, and communication device 260. Input device 220 and output device 230 can generally correspond to those described above, and can either be connectable or integrated with the computer.

Input device 220 can be any suitable device that provides input, such as a touch screen, keyboard or keypad, mouse, or voice-recognition device. Output device 230 can be any suitable device that provides output, such as a touch screen, haptics device, or speaker.

Storage 240 can be any suitable device that provides storage, such as an electrical, magnetic or optical memory including a RAM, cache, hard drive, or removable storage disk. Communication device 260 can include any suitable device capable of transmitting and receiving signals over a network, such as a network interface chip or device. The components of the computer can be connected in any suitable manner, such as via a physical bus or wirelessly.

Software 250, which can be stored in storage 240 and executed by processor 210, can include, for example, the programming that embodies the functionality of the present disclosure (e.g., as embodied in the devices as described above).

Software 250 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 240, that can contain or store programming for use by or in connection with an instruction execution system, apparatus, or device.

Software 250 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 200 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 200 can implement any operating system suitable for operating on the network. Software 250 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

EMBODIMENTS

Exemplary methods, non-transitory computer-readable storage media, systems, and electronic devices are set out in the following items:

1. A computer-enabled method for operating a robot, the method comprising:
   obtaining an instruction for the robot, wherein the instruction is associated with a first user;
   identifying, based on the instruction, a task;
   transmitting the task to the robot;
   receiving, from the robot, a request associated with the task;
   determining whether the request can be solved by one or more trained machine-learning algorithms;
   if the request cannot be solved by the one or more trained machine-learning algorithms, transmitting a query to a second user's electronic device;
   receiving a response to the query from the second user; and
   causing the task to be performed by the robot based on the response.
2. The method of item 1, wherein the instruction is a natural-language instruction and the natural-language instruction directs the robot to pick and/or place one or more objects.
3. The method of any of items 1-2, wherein the task comprises a plurality of sub-tasks, and wherein the plurality of sub-tasks comprises a pick sub-task and a drop sub-task.
4. The method of item 3, wherein the request comprises an image and a query for one or more pick parameters.
5. The method of item 4, wherein the pick parameters comprise a pick point, a grasp angle, a grasp depth, or any combination thereof.
6. The method of item 3, wherein the request comprises an image and a query for one or more drop parameters.
7. The method of item 6, wherein the drop parameters comprise a drop point, a rotation angle, a height for dropping, or any combination thereof.
8. The method of any of items 1-7, wherein determining whether the request can be solved by one or more trained machine-learning algorithms comprises:
   inputting data captured by the robot to the one or more trained machine-learning models to obtain a solution and a confidence score associated with the solution;
   determining whether the confidence score is lower than a predefined threshold.
9. The method of item 8, wherein the query includes the solution by the one or more machine-learning models.
10. The method of item 8, wherein the data captured by the robot comprises an image.
11. The method of item 8, further comprising: training the one or more machine-learning models based on the response from the second user.
12. The method of item 9, further comprising: causing display of a first graphical user interface comprising one or more images captured by the robot.
13. The method of item 11, wherein the first graphical user interface further comprises:
    an indication of the solution by the one or more machine-learning models; and
    one or more user interface control for accepting the solution.
14. The method of any of items 1-13, further comprising: causing display of a second graphical user interface on the first user's electronic device for receiving the instruction.
15. The method of item 14, wherein the second graphical user interface is selected based on a target application of the robot.
16. An electronic device, comprising:
    one or more processors;
    a memory; and
    one or more programs, wherein the one or more programs are stored in the memory and configured to be executed by the one or more processors, the one or more programs including instructions for:

obtaining an instruction for the robot, wherein e instruction is associated with a first user;

identifying, based on the instruction, a task;

transmitting the task to the robot;

receiving, from the robot, a request associated with the task;

determining whether the request can be solved by one or more trained machine-learning algorithms;

if the request cannot be solved by the one or more trained machine-learning algorithms, transmitting a query to a second user's electronic device;

receiving a response to the query from the second user; and causing the task to be performed by the robot based on the response.

17. A non-transitory computer-readable storage medium storing one or more programs, the one or more programs comprising instructions, which when executed by one or more processors of an electronic device, cause the electronic device to perform:

obtaining an instruction for the robot, wherein the instruction is associated with a first user;

identifying, based on the instruction, a task;

transmitting the task to the robot;

receiving, from the robot, a request associated with the task;

determining whether the request can be solved by one or more trained machine-learning algorithms;

if the request cannot be solved by the one or more trained machine-learning algorithms, transmitting a query to a second user's electronic device;

receiving a response to the query from the second user; and causing the task to be performed by the robot based on the response.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-enabled method for operating a robot, the method comprising:

obtaining an instruction for the robot, wherein the instruction is associated with a first user;

identifying, based on the instruction, a task;

transmitting the task to the robot;

receiving, from the robot, a request associated with the task;

determining, by the computer, if a score indicative of the ability of one or more trained machine-learning algorithms to solve the request fulfills a predefined threshold;

if the score indicative of the ability of the one or more trained machine-learning algorithms to solve the request does not fulfill the predefined threshold, transmitting a query to a second user's electronic device;

receiving a response to the query from the second user; and causing the task to be performed by the robot based on the response.

2. The method of claim 1, wherein the instruction is a natural-language instruction and the natural-language instruction directs the robot to pick and/or place one or more objects.

3. The method of claim 1, wherein the task comprises a plurality of sub-tasks, and wherein the plurality of sub-tasks comprises a pick sub-task and a drop sub-task.

4. The method of claim 3, wherein the request comprises an image and a query for one or more pick parameters.

5. The method of claim 4, wherein the pick parameters comprise a pick point, a grasp angle, a grasp depth, or any combination thereof.

6. The method of claim 3, wherein the request comprises an image and a query for one or more drop parameters.

7. The method of claim 6, wherein the drop parameters comprise a drop point, a rotation angle, a height for dropping, or any combination thereof.

8. The method of claim 1, wherein the score indicative of the ability of the one or more trained machine-learning algorithms to solve the request is a confidence score associated with a solution generated by inputting data captured by the robot to the one or more trained machine-learning models.

9. The method of claim 8, wherein the query includes the solution by the one or more machine-learning models.

10. The method of claim 8, wherein the data captured by the robot comprises an image.

11. The method of claim 8, further comprising: training the one or more machine-learning models based on the response from the second user.

12. The method of claim 9, further comprising: causing display of a first graphical user interface comprising one or more images captured by the robot.

13. The method of claim 11, wherein the first graphical user interface further comprises:

an indication of the solution by the one or more machine-learning models; and one or more user interface control for accepting the solution.

14. The method of claim 1, further comprising: causing display of a second graphical user interface on the first user's electronic device for receiving the instruction.

15. The method of claim 14, wherein the second graphical user interface is selected based on a target application of the robot.

16. An electronic device, comprising:

one or more processors;

a memory; and one or more programs, wherein the one or more programs are stored in the memory and configured to be executed by the one or more processors, the one or more programs including instructions for:

obtaining an instruction for the robot, wherein the instruction is associated with a first user;

identifying, based on the instruction, a task;

transmitting the task to the robot;

receiving, from the robot, a request associated with the task;

determining, by the computer, if a score indicative of the ability of one or more trained machine-learning algorithms to solve the request fulfills a predefined threshold;

if the score indicative of the ability of the one or more trained machine-learning algorithms to solve the request does not fulfill the predefined threshold, transmitting a query to a second user's electronic device;

receiving a response to the query from the second user; and causing the task to be performed by the robot based on the response.

17. A non-transitory computer-readable storage medium storing one or more programs, the one or more programs comprising instructions, which when executed by one or more processors of an electronic device, cause the electronic device to perform:

obtaining an instruction for the robot, wherein the instruction is associated with a first user;

identifying, based on the instruction, a task;

transmitting the task to the robot;

receiving, from the robot, a request associated with the task;

determining, by the computer, if a score indicative of the ability of one or more trained machine-learning algorithms to solve the request fulfills a predefined threshold;

if the score indicative of the ability of the one or more trained machine-learning algorithms to solve the request does not fulfill the predefined threshold, transmitting a query to a second user's electronic device;

receiving a response to the query from the second user; and causing the task to be performed by the robot based on the response.

* * * * *